United States Patent [19]

Young

[11] Patent Number: 4,487,304
[45] Date of Patent: Dec. 11, 1984

[54] CONTROL SYSTEM FOR A FLUID PRESSURE ENGAGED CLUTCH

[75] Inventor: Alastair J. Young, Kenilworth, England

[73] Assignee: Automotive Products plc, Leamington Spa, England

[21] Appl. No.: 387,426

[22] Filed: Jun. 11, 1982

[30] Foreign Application Priority Data

Jun. 25, 1981 [GB] United Kingdom ............... 8119698

[51] Int. Cl.³ .............................................. F16D 25/14
[52] U.S. Cl. ................................................ 192/85 R
[58] Field of Search ............... 192/85 R; 91/433, 461; 137/625.61, 625.64; 251/63

[56] References Cited

U.S. PATENT DOCUMENTS

| | | | |
|---|---|---|---|
| 2,822,901 | 2/1958 | Forster | 192/85 R |
| 3,155,040 | 11/1964 | Shurts et al. | 192/85 R |
| 3,517,699 | 6/1970 | Marcum | 137/625.64 |

FOREIGN PATENT DOCUMENTS

| | | |
|---|---|---|
| 1208193 | 10/1970 | United Kingdom . |
| 1267956 | 2/1972 | United Kingdom . |
| 1312351 | 4/1973 | United Kingdom . |
| 1314372 | 4/1973 | United Kingdom . |
| A2039335 | 8/1980 | United Kingdom . |

Primary Examiner—Rodney H. Bonck
Assistant Examiner—James J. Merek
Attorney, Agent, or Firm—Kemon & Estabrook

[57] ABSTRACT

A hydraulic pressure control valve for a fluid pressure operated clutch includes a piston responsive to a pilot control pressure as a proportion of source pressure and feedback pressure indicative of fluid pressure in the clutch to connect the clutch to source pressure whenever pilot pressure exceeds feedback pressure and to connect the clutch to drain whenever feedback pressure exceeds pilot pressure.

3 Claims, 3 Drawing Figures

CONTROL SYSTEM FOR A FLUID PRESSURE ENGAGED CLUTCH

This invention relates to fluid pressure engaged clutches for motor vehicle transmissions.

In such transmissions fluid pressure engaged clutches are provided to transmit driving torque from an input to an output. Such clutches are frequently employed to effect a dynamic ratio change from one speed ratio to another. It is important that the rate of engagement and the engagement pressure of these clutches be adaptable to suit differing transmission operating conditions. For example, the clutch engagement conditions for a lightly loaded vehicle moving downhill are very different from those of a heavily loaded vehicle moving uphill.

It is known to alter the rate of clutch engagement and the final engagement pressure in accordance with vehicle throttle opening. Such modulation has in the past been effected by a variety of hydro-mechanical devices to achieve a range of clutch control. These devices have seldom been wholly successful due to the build up of mechanical and hydraulic manufacturing tolerances.

It has been proposed to include a closure valve in the clutch feed line, the valve being electrically switched at high frequency between supply and drain conditions to create the desired clutch pressure. The electrical signal is preferably of square wave form and its mark to space ratio is varied to control the energisation time of the valve as a proportion of the signal period. Dependent on the mark to space ratio such a high frequency signal has the effect of maintaining the valve at any desired part-open condition and the valve has a fast and accurate response to signal changes. The absolute opening and rate of change of opening of the valve can thus be precisely controlled.

It is a disadvantage of such valves when used in this way that, in order to pass the high flow rates of fluid necessary for clutch operation, the valves themselves must be large and are consequently space consuming. Furthermore, they are expensive and have a high power requirement.

A subsidiary disadvantage is that pressure pulses from such valves can affect the smooth operation of the clutch.

It has also been proposed in our U.K. patent application No. 80 38034 to use such a valve to generate a pilot fluid pressure signal which operates a valve to control admission of main pressure to the clutch. Whilst overcoming the aforementioned disadvantages this solution is not the most economical since two electrically controlled valves are required, one to generate a pilot pressure signal and one to control admission of main pressure to the clutch.

It is also desirable for the rate of increase of clutch engagement pressure to be constant regardless of the final engagement pressure to ensure accurate and precise actuation of the clutch. Hitherto the rate of increase of clutch engagement pressure has been variable.

According to the present invention there is provided clutch control means for location between a fluid pressure source and hydraulic actuation means for a clutch, and comprising pilot pressure means responsive to an electrical drive signal to provide a pilot pressure to a proportion of source pressure and control valve means responsive to said pilot pressure and to a feedback pressure indicative of pressure in said actuation means to connect said source and actuation means whenever pilot pressure exceeds feedback pressure and to connect said actuation means to a drain whenever feedback pressure exceeds pilot pressure.

Preferably the control valve means comprises a spool valve having end ports to which pilot pressure and feedback pressure are respectively applied and a spool having equal opposed end areas for exposure to pressure at said end ports, a fluid restriction being provided between said spool valve and the feedback end port.

Other features of the invention are included in the following description of a preferred embodiment described, by way of example only, with reference to the accompanying drawings in which.

Figure 1:
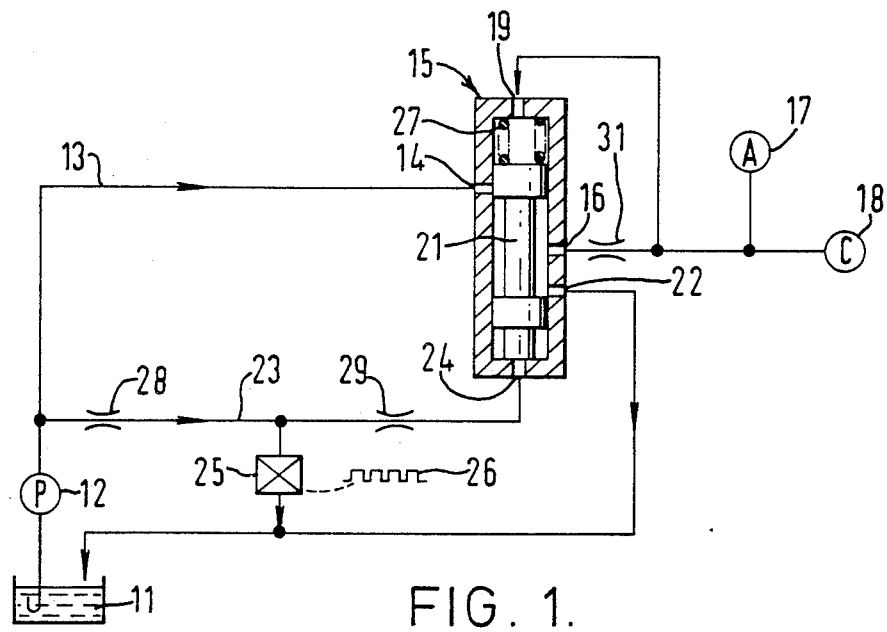
FIG. 1 is a schematic illustration of a hydraulic control circuit according to the invention.

With reference to the drawing there is shown a hydraulic circuit for controlling engagement of a fluid actuated clutch for a motor vehicle transmission.

There is provided a reservoir 11 from which a pump 12 supplies fluid under pressure through a main feed passage 13 to the supply port 14 of a spool valve 15.

The spool valve 15 has an outlet port 16 connected to a hydraulic accumulator 17 and fluid pressure actuated clutch 18, and a feedback port 19 connected to the outlet port 16 and opening onto one end of the spool 21 of the valve 15.

A drain port 22 is connected to the reservoir 11.

The pump 12 also supplies fluid under pressure through a signal feed passage 23 to a signal port 24 opening on to the other end of the valve spool 21.

A solenoid operated valve 25 is responsive to an electrical square wave signal 26 to dump a proportion of fluid in the passage 23 to the reservoir 11. The mark to space ratio of the signal 26 controls the opening of the valve as a proportion of signal period and thus determines the fluid pressure downstream of the valve 25.

A light spring 27 serves to return the valve spool 21 to one end of its bore when the clutch is not pressurised.

Fluid flow and pressure restrictions 28 29 and 31 are provided to maintain optimum conditions in the hydraulic circuit.

Operation of the hydraulic circuit is as follows:

The pump 12 is running and solenoid operated valve 25 is open, i.e. the signal 26 is at constant base level. Fluid loss through the open valve 25 is minimised by the restrictor 28 and any residual pressure at the signal port 24 is countered by the effect of the light spring 27. Supply port 14 is blocked, outlet port 16 and drain port 22 are connected.

To engage the clutch 18 a square wave signal is applied to the solenoid of the valve 25 which partially closes to allow fluid pressure to build up on the end of spool 21.

At a minimal pressure the effect of the spring 27 is overcome and the spool 21 moves to close the drain port 22 and connect the supply port 14 and the outlet port 16. The accumulator 17 charges and as the effect of its return spring(s) is overcome the clutch engages.

Figure 2:
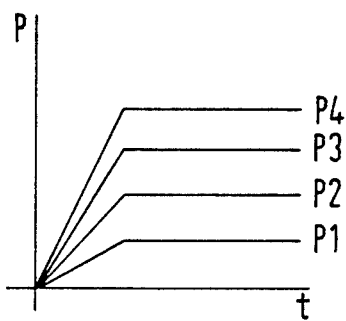
FIG. 2 is a graph showing rate of increase of clutch engagement pressure for a prior art arrangement.

Since the spool 21 has equal opposed end areas the pressure applied at the feedback port 19 will limit the pressure at the outlet port 16 by shifting the spool to close the supply port 14 and open the drain port 22 whenever pressure at the feedback port 19 exceeds pressure at the signal port 24. It is important that the fluid restriction 31 is upstream of the feedback port 19 to ensure that the spool 21 fully opens the supply port 14. If no restriction were provided, fluid pressure at the feedback port 19 would tend to rise to pump pressure almost instantaneously with the result that the spool 21 would not fully open the supply port 14. The spool 21 would control the rate of pressure increase at the outlet port 16 as a function of pressure at the signal port 24. The effect of this is shown in FIG. 2 for several values (P1-P4) of pressure at the signal port 24.

Figure 3:
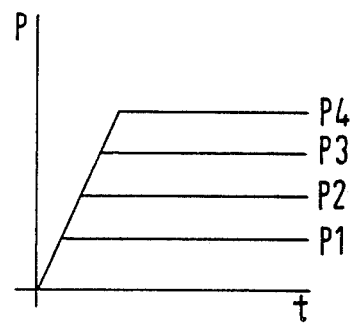
FIG. 3 is a graph corresponding to FIG. 2 and showing the effect of the invention.

With reference to FIG. 3, the restriction 31 ensures that pressure increase at feedback port 19 is delayed sufficiently to allow the spool to fully open supply port 14. Thus the rate of pressure increase to the clutch is constant for the several example values of signal pressure shown (P1-P4), a sharp cut-off being provided as pressure at feedback port 19 exceeds signal pressure at port 24. In this way fluid pressure in the clutch 18 is precisely regulated according to the value of pressure at the signal port 24 and with a constant rate of pressure increase.

The restriction 31 also serves as the usual feed restrictor to the accumulator 17 and clutch 18.

Should it be necessary to alter the clutch actuating pressure this can rapidly be achieved by changing the mark to space ratio of the signal 26 and so change the value of pressure at the signal port 24.

Thus clutch actuating pressure is accurately and economically regulated by the solenoid operated valve 25 which need only have a very small flow capacity and can consequently be of small size and economical construction.

The spool 21 serves to close the supply port 14 when the clutch is not required to be actuated and thus a separate closure valve in the main feed passage 13 is not required.

I claim:

1. Clutch control means for location between a fluid pressure source and hydraulic actuation means for said clutch and comprising:

pilot pressure means responsive to an electrical drive signal to provide a pilot pressure as a proportion of source pressure; control valve means comprising:

a housing having a bore therein;

a valve spool slidably in the bore;

an inlet port in said housing for connection to said source and selectively openable to the interior of the valve by sliding movement of said spool;

a drain port in said housing selectively openable to the interior of the valve by sliding movement of said spool;

an outlet port in said housing for connection of said actuation means to the interior of the housing and thereby selectively connectable to said inlet and drain ports in response to sliding movement of said spool;

a pilot port in said housing connected to said pilot pressure means for supplying pilot pressure to said spool for moving the spool to tend to open the inlet port and close the drain port;

a feedback port in said housing such that a feedback pressure is applied to the spool to tend to open the drain port and close the inlet port;

a connection for fluid flow leading from the outlet port to said hydraulic actuation means;

a fluid flow restriction in said connection; and a feedback passage leading to said feedback port from said connection after said restriction such that said feedback port is supplied with pressure from said outlet through said restriction.

2. Clutch control means according to claim 1, wherein said pilot pressured means comprise a valve to alternate between supply and drain conditions in response to an alternating drive signal, the mark to space ratio of said signal controlling the supply condition of said valve as a proportion of signal period to vary pilot pressure as a proportion of source pressure.

3. Clutch control means according to claim 1 wherein said pilot port and feedback port are disposed in opposite ends of said housing and pilot and feedback pressures act on equal opposed end areas of said spool.

* * * * *